US008761365B2

(12) United States Patent
Baccay et al.

(10) Patent No.: US 8,761,365 B2
(45) Date of Patent: Jun. 24, 2014

(54) COMMUNICATION DEVICE FOR PROVIDING AN AUTOMATICALLY INITIATED OUTGOING COMMUNICATION AS AN INCOMING COMMUNICATION

(75) Inventors: Peter Eymard Baccay, San Jose, CA (US); Irina Mikheyenok, Castro Valley, CA (US); Mary Elaine Rabonza, Fairfield, CA (US); Christina Evelyn Lucey, San Francisco, CA (US)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 13/397,454

(22) Filed: Feb. 15, 2012

(65) Prior Publication Data

US 2013/0208877 A1    Aug. 15, 2013

(51) Int. Cl.
*H04M 3/42*    (2006.01)

(52) U.S. Cl.
USPC ....... 379/202.01; 370/261; 709/204; 709/227

(58) Field of Classification Search
USPC .............. 379/202.01; 370/261; 709/204, 227
See application file for complete search history.

(56) References Cited

U.S. PATENT DOCUMENTS

| 6,798,753 | B1 | 9/2004 | Doganata et al. |
| 7,876,889 | B2 | 1/2011 | Berstis et al. |
| 2003/0035381 | A1* | 2/2003 | Chen et al. ................... 370/261 |
| 2004/0018830 | A1 | 1/2004 | Pugliese |
| 2005/0094792 | A1* | 5/2005 | Berthoud et al. ........ 379/202.01 |
| 2007/0049261 | A1 | 3/2007 | Joglekar |
| 2009/0170492 | A1 | 7/2009 | Lee |
| 2010/0098230 | A1 | 4/2010 | Bhow |
| 2010/0121666 | A1 | 5/2010 | Niazi |
| 2011/0228922 | A1 | 9/2011 | Dhara et al. |

FOREIGN PATENT DOCUMENTS

| EP | 2219142 A1 | 8/2010 |
| EP | 2360953 A1 | 8/2011 |
| EP | 2364007 A1 | 9/2011 |
| WO | 2005104512 A1 | 11/2005 |
| WO | 2010045070 A1 | 4/2010 |

OTHER PUBLICATIONS

Extended European search report mailed Jul. 4, 2012, in corresponding European patent application No. 12155576.7.

* cited by examiner

*Primary Examiner* — Quynh Nguyen
(74) *Attorney, Agent, or Firm* — Novak Druce Connolly Bove + Quigg LLP (57) ABSTRACT

A communication device and method for providing an automatically initiated outgoing communication as an incoming communication are provided. Outgoing communication is automatically initiated via a communication interface of the communication device. After the outgoing communication is initiated, an indication of the outgoing communication is provided at the communication device, such that the outgoing communication is provided as an incoming communication at the communication device.

15 Claims, 6 Drawing Sheets

COMMUNICATION DEVICE FOR PROVIDING AN AUTOMATICALLY INITIATED OUTGOING COMMUNICATION AS AN INCOMING COMMUNICATION

FIELD

The specification relates generally to communication devices, and specifically to a communication device for providing an automatically initiated outgoing communication as an incoming communication.

BACKGROUND

The evolution of computers is currently quite active in the mobile device environment. It is now well-known to including calendaring, contacts, and messaging functions in mobile devices. More recently, there has been a veritable explosion of the number and type of applications that are configured to the unique form factors and computing environments of mobile devices.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

An aspect of the specification provides a communication device comprising: a processor and a communication interface, the processor enabled to: automatically initiate an outgoing communication at a scheduled given time via the communication interface; and, after the outgoing communication is initiated, provide an indication of the outgoing communication, such that the outgoing communication is provided as an incoming communication.

The outgoing communication can be initiated without providing an indicator of the outgoing communication. The outgoing communication can be initiated without providing an indicator of the outgoing communication other than an indicator of the outgoing communication rendered in an indicator area of a display of the communication device. The indicator can comprise one or more of an icon and a radio-in-use icon. The indicator area can comprise a header of at the display.

When the outgoing communication is initiated, at least a portion of normally provided indications associated with outgoing communications can be suppressed. One or more of a dial-out indication and a dial-tone can be suppressed. At least a portion of normally provided indications of outgoing communications can be suppressed by muting a speaker at the communication device. At least a portion of normally provided indications of outgoing communications can be suppressed by preventing rendering of an identifier of a remote communication device associated with the outgoing communication.

The indication of the outgoing communication can be provided as one or more of a caller (identification), an identifier of the outgoing communication, an identifier of a conference call associated with the outgoing communication, and an identifier of meeting data associated with the outgoing communication.

The indication can comprise an incoming communication template with fields populated with outgoing communication data.

The processor can be further enabled to determine that the outgoing communication is scheduled by processing a calendar database to determine that the outgoing communication is associated with meeting data associated with the scheduled given time.

The processor can be further enabled to automatically initiate the outgoing communication at one or more of the scheduled given time and within a given time period before the scheduled given time.

The processor can be further enabled to automatically initiate the outgoing communication by: initiating the outgoing communication; and, when a called communication device responds to a request for initiating the outgoing communication, automatically providing log-in data for joining a conference call to the called communication device.

The processor can be further enabled to, when connecting the outgoing communication is unsuccessful, automatically reattempt to automatically initiate the outgoing communication after a given time period.

The processor can be further enabled to provide the indication of the outgoing communication when one of a called communication device answers the outgoing communication, and when the outgoing communication is logged into an associated conference call.

The processor can be further enabled to, when the indication is provided before one of a called communication device answers the outgoing communication and the outgoing communication is logged into an associated conference call, mute the outgoing communication.

A further aspect of the specification provides a method comprising: automatically initiating, at a processor of a communication device, an outgoing communication at a scheduled given time via a communication interface of the communication device; and, after the outgoing communication is initiated, providing an indication of the outgoing communication at the communication device, such that the outgoing communication is provided as an incoming communication at the communication device.

The outgoing communication can be initiated without providing an indicator of the outgoing communication. The outgoing communication can be initiated without providing an indicator of the outgoing communication other than an indicator of the outgoing communication rendered in an indicator area of a display of the communication device. The indicator can comprise one or more of an icon and a radio-in-use icon. The indicator area can comprise a header of at the display.

When the outgoing communication is initiated, at least a portion of normally provided indications associated with outgoing communications can be suppressed. One or more of a dial-out indication and a dial-tone can be suppressed. At least a portion of normally provided indications of outgoing communications can be suppressed by muting a speaker at the communication device. At least a portion of normally provided indications of outgoing communications can be suppressed by preventing rendering of an identifier of a remote communication device associated with the outgoing communication.

The indication of the outgoing communication can be provided as one or more of a caller ID (identification), an identifier of the outgoing communication, an identifier of a conference call associated with the outgoing communication, and an identifier of meeting data associated with the outgoing communication.

The indication can comprise an incoming communication template with fields populated with outgoing communication data.

The method can further comprise determining that the outgoing communication is scheduled can by processing a calendar database to determine that the outgoing communication is associated with meeting data associated with the scheduled given time.

The outgoing communication can be automatically initiated at one or more of the scheduled given time and within a given time period before the scheduled given time.

Automatically initiating the outgoing communication can comprise: initiating the outgoing communication; and, when a called communication device responds to a request for initiating the outgoing communication, automatically providing log-in data for joining a conference call to the called communication device.

The method can further comprise, when connecting the outgoing communication is unsuccessful, automatically reattempting automatically initiating the outgoing communication after a given time period.

The indication of the outgoing communication can be provided when one of a called communication device answers the outgoing communication, and when the outgoing communication is logged into an associated conference call.

When the indication is provided before one of a called communication device answers the outgoing communication and the outgoing communication is logged into an associated conference call, the outgoing communication can be muted.

Yet another aspect of the specification provides a computer program product, comprising a computer usable medium having a computer readable program code adapted to execute a method comprising: automatically initiating, at a processor of a communication device, an outgoing communication at a scheduled given time via a communication interface of the communication device; and, after the outgoing communication is initiated, providing an indication of the outgoing communication at the communication device, such that the outgoing communication is provided as an incoming communication at the communication device. The computer program product can comprise a non-transitory computer program product.

Figure 1:
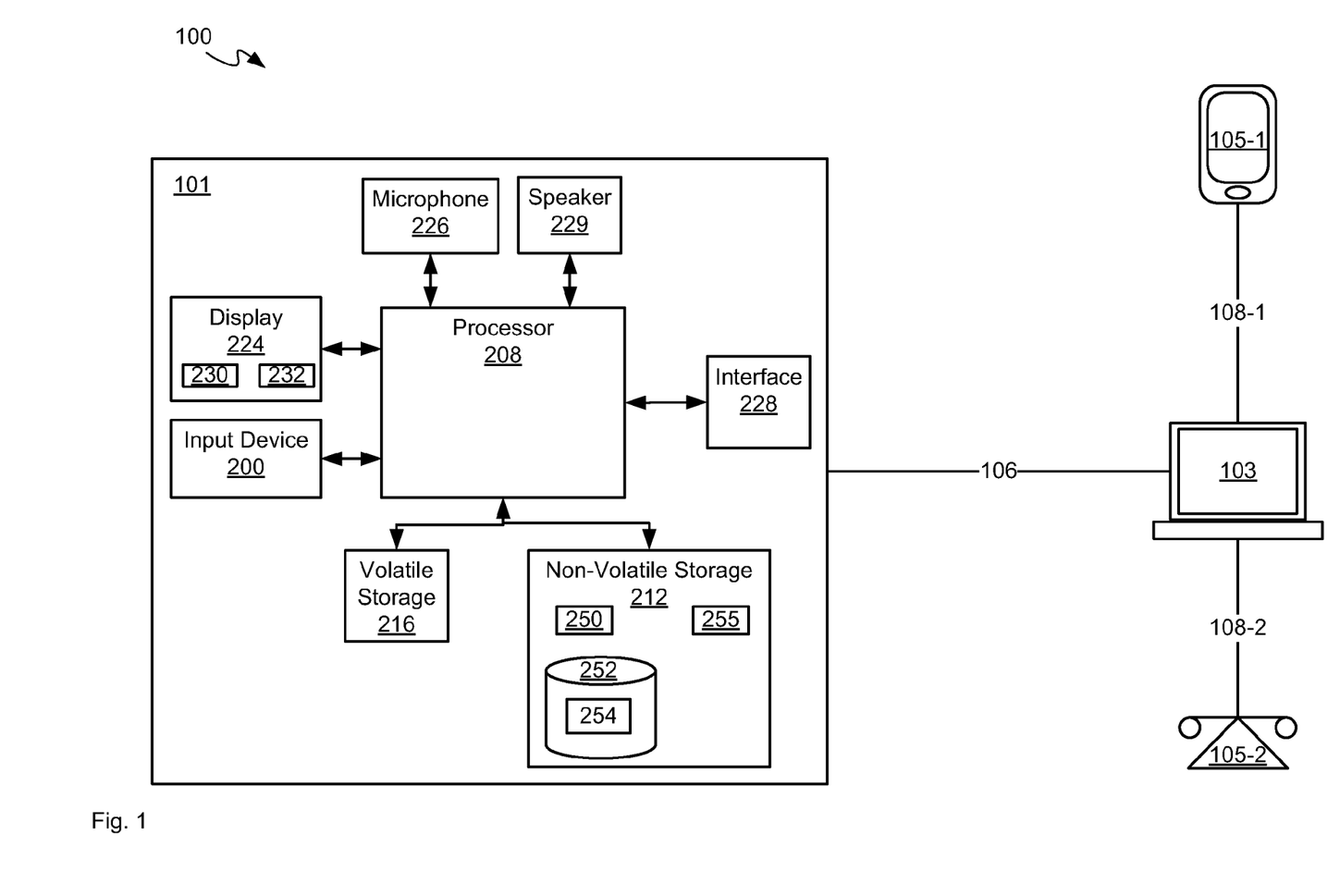
FIG. 1 depicts a system for providing an automatically initiated outgoing communication as an incoming communication, according to non-limiting implementations.

FIG. 1 depicts a system 100 for automatically providing an automatically initiated outgoing communication as an incoming communication, and according to non-limiting implementations. System 100 comprises a communication device 101 enabled to initiate outgoing communications to a remote communication device 103 via a link 106. Communication device 101 and communication device 103 will also be respectfully referred to hereafter as device 101 and device 103. This convention will be used elsewhere in the present specification. Device 103 is further enabled to receive requests for communications from other communication devices 105-1, 105-2 via links 108-1, 108-2, which will also be referred to hereafter generically as a link 108, and collectively as links 108. This convention will also be used elsewhere in the present specification. For example, device 103 can comprise a conference call server enabled to receive communications from one or more of devices 101, 105 in a conference call. In such implementations, communications can comprise telephone calls, voice calls, mobile calls, VoIP (voice over internet protocol) calls, PSTN (public switched telephone network) and the like.

As will be described below, device 101 is generally enabled to: automatically initiate an outgoing communication at a scheduled time; and, after the outgoing communication is initiated, providing an indication of the outgoing communication at device 101 as an incoming communication at the device 101.

It is further more appreciated that while only three devices 101, 105 are depicted in FIG. 1, system 100 can comprise any suitable number of communication devices, including hundreds to thousands to millions of devices. Indeed, system 100 can comprise any number of devices enabled to participate in a conference call at device 103.

Furthermore, while only one device 103 is depicted in FIG. 1, system 100 can comprise any suitable number of conference call servers.

Device 101 can be any type of electronic device that can be used in a self-contained manner to interact with a communications network via link 106. It is hence appreciated that device 101 comprises any suitable communication device for communicating with device 103 and/or devices 105. Device 101 includes, but is not limited to, any suitable combination of computing devices, personal computers, laptop computers, portable electronic devices, mobile computing device, portable computing devices, tablet computing devices, laptop computing devices, desktop phones, telephones, PDAs (personal digital assistants), cellphones, smartphones and the like. Other suitable communication devices are within the scope of present implementations.

Each of links 106, 108 comprises any suitable link, including any suitable combination of wired and/or wireless links, wired and/or wireless devices and/or wired and/or wireless networks, including but not limited to any suitable combination of USB (universal serial bus) cables, serial cables, wireless links, cell-phone links, cellular network links (including but not limited to 2G, 2.5G, 3G, 4G+, and the like) wireless data, Bluetooth links, NFC (near field communication) links, WiFi links, WiMax links, packet based links, the Internet, analog networks, the PSTN (public switched telephone network), access points, and the like, and/or a combination.

It is appreciated that FIG. 1 further depicts a schematic diagram of device 101 according to non-limiting implementations. It should be emphasized that the structure of device 101 in FIG. 1 is purely exemplary, and contemplates a device that can be used for both wireless voice (e.g. telephony) and wireless data communications (e.g. email, web browsing, text, and the like). Device 101 comprises at least one input device 200 generally enabled to receive input data, and can comprise any suitable combination of input devices, including but not limited to a keyboard, a keypad, a pointing device, a mouse, a track wheel, a trackball, a touchpad, a touch screen and the like. Other suitable input devices are within the scope of present implementations, Input from input device 200 is received at processor 208 (which can be implemented as a plurality of processors, including but not limited to one or more central processing units (CPUs)). Processor 208 is configured to communicate with a non-volatile storage unit 212 (e.g. Erasable Electronic Programmable Read Only Memory ("EEPROM"), Flash Memory) and a volatile storage unit 216 (e.g. random access memory ("RAM")). Programming instructions that implement the functional teachings of device 101 as described herein are typically maintained, persistently, in non-volatile storage unit 212 and used by processor 208 which makes appropriate utilization of volatile storage 216 during the execution of such programming instructions. Those skilled in the art will now recognize that non-volatile storage unit 212 and volatile storage 216 are examples of computer readable media that can store programming instructions executable on processor 208. Furthermore, non-volatile storage unit 212 and volatile storage 216 are also examples of memory units and/or memory modules.

Processor 208 in turn can also be configured to communicate with a display 224, a microphone 226 and a speaker 229. Display 224 comprises any suitable one of or combination of CRT (cathode ray tube) and/or flat panel displays (e.g. LCD (liquid crystal display), plasma, OLED (organic light emitting diode), capacitive or resistive touchscreens, and the like). It is generally appreciated that display 224 comprises circuitry 230 that can be controlled, for example by processor 208, to render a representation 232 of data at display 224, for example an indication of an outgoing communication as explained in further detail below with regard to FIG. 6.

Microphone 226 comprises any suitable microphone for emitting sound data, which can be transmitted to device 101. Speaker 229 comprises any suitable speaker for providing sound data at device 101. It is appreciated that microphone 226 and speaker 229 can be used in combination at device 101 to conduct communications comprising a voice call, for example with one or more of devices 103, 105.

In some implementations, input device 200 and display 224 are external to device 101, with processor 208 in communication with each of input device 200 and display 224 via a suitable connection and/or link. Similarly, microphone 226 and speaker 229 can be external to device 101, for example integrated into a headset that can be connected to device 101.

Processor 208 also connects to a network communication interface 228, referred to hereafter as interface 228, which can be implemented as one or more radios configured to communicate over link 106. In general, it will be understood that interface 228 is configured to correspond with the network architecture that is used to implement link 106. In other implementations a plurality of links with different protocols can be employed and thus interface 228 can comprise a plurality of interfaces to support each link.

While not depicted, in some implementations, device 101 can further comprise at least one optional notification device, such as a light, an LED (light emitting diode), a vibrational motor and the like, for providing notifications of incoming communications, such as phone calls, text messages, emails and the like, either alone or in combination with each other and/or display 224 and/or speaker 229. Otherwise, notifications of incoming communications are provided via display 224, speaker 229 and/or a combination.

In particular, it is appreciated that non-volatile storage 212 stores an application 250 for managing communications. When processor 208 processes application 250, processor 208 is enabled to: automatically initiate an outgoing communication at a scheduled time, for example a voice call to device 103; and, after the outgoing communication is initiated, providing an indication of the communication at device 101 as an incoming communication at the device 101.

In some implementations, non-volatile storage 212 further stores a calendar database 252 that stores meeting event data 254 comprising data associated with at least one scheduled event. For example meeting event data 254 can comprise the contents of Table 1:

TABLE 1

| Subject | Patent Review Committee Meeting |
|---|---|
| Date | Feb. 1, 2012 |
| Start Time | 10:00 am |
| End Time | 11:00 am |
| Dial In Number | 204-555-1212 |
| Log-In Code | 3459345 |

Table 1 comprises data associated with a meeting (i.e. a conference call) having a subject of "Patent Review Committee Meeting" scheduled on Feb. 1, 2012, starting at 10:00 am and ending at 11:00 am, that is to be held via a conferencing server with dial-in number phone number "204-555-1212", and with a participant code/log-in code of 3459345. While Table 1 is arranged in rows and columns, the format of Table 1 and/or meeting event data 254 is appreciated to be generally non-limiting. For example, while Table 1 includes rows and corresponding fields for a "Subject", a "Date", a "Start Time", an "End Time", a "Dial In Number" and a "Log-In Code", the actual numbers of rows, columns, fields and format thereof, is appreciated to be non-limiting and Table 1 can comprise more rows/fields or fewer rows/fields.

It is further appreciated that the log-in code comprises log-in data for joining an associated conference call, the log-in data to be provided to a conference server once the conference server answers a call to the conference call server. In practice, once the conference server answers the call, the log-in data is requested, for example by providing an indication to enter the log-in data (e.g. an audible indication such as "Please enter log-in data"). Log-in data is then entered at device 101 and conveyed to the conference call server, for example via DTMF (dial-tone multi-frequency) signalling and the like, It is further appreciated that while only one log-in code is depicted in Table 1, in other implementations, any suitable number of log-in codes can be provided, for example when an associated conference call requires more than one log-in code.

It is further appreciated that non-volatile storage can store at least one template 255 for providing an indication of an incoming communication, for rendering at display 224 when an in-coming communication is received. For example, attention is directed to FIG. 2 which depicts a non limiting, example of template 255 which can be specifically associated with telephone calls, including but not limited to mobile calls, voice calls, VoIP calls, PSTN based calls, and the like. As depicted, template 255 comprises text 279 indicative that an "Incoming Call" is being received, a field 280 for providing a picture associated with an incoming call, a field 282 for providing Caller ID (identification) associated with an incoming call, and an field 284 for providing an identifier associated with an incoming call, such as an associated telephone number and the like. Hence, when an incoming telephone call is received, circuitry 230 is controlled at display 224 to render representation 232 of template 255, with however fields 280, 282, 284 populated with data associated with the incoming telephone call. For example, field 282 is populated with the caller ID, and field 284 is populated with the associated telephone number, each of which is received as metadata with the incoming telephone call. Field 280 can be populated either when image data is received with the incoming telephone call and/or when image data associated with an identifier of the incoming call (e.g. the caller ID and/or the telephone number) is stored at non-volatile storage 212; otherwise field 280 can be left blank or populated with given generic image data, such as an outline of human being, and the like. Such generic image data can be stored at non-volatile storage 212 and/or field 280 can comprise such generic image data, which would be substituted for image data associated with the telephone call when present.

Figure 2:
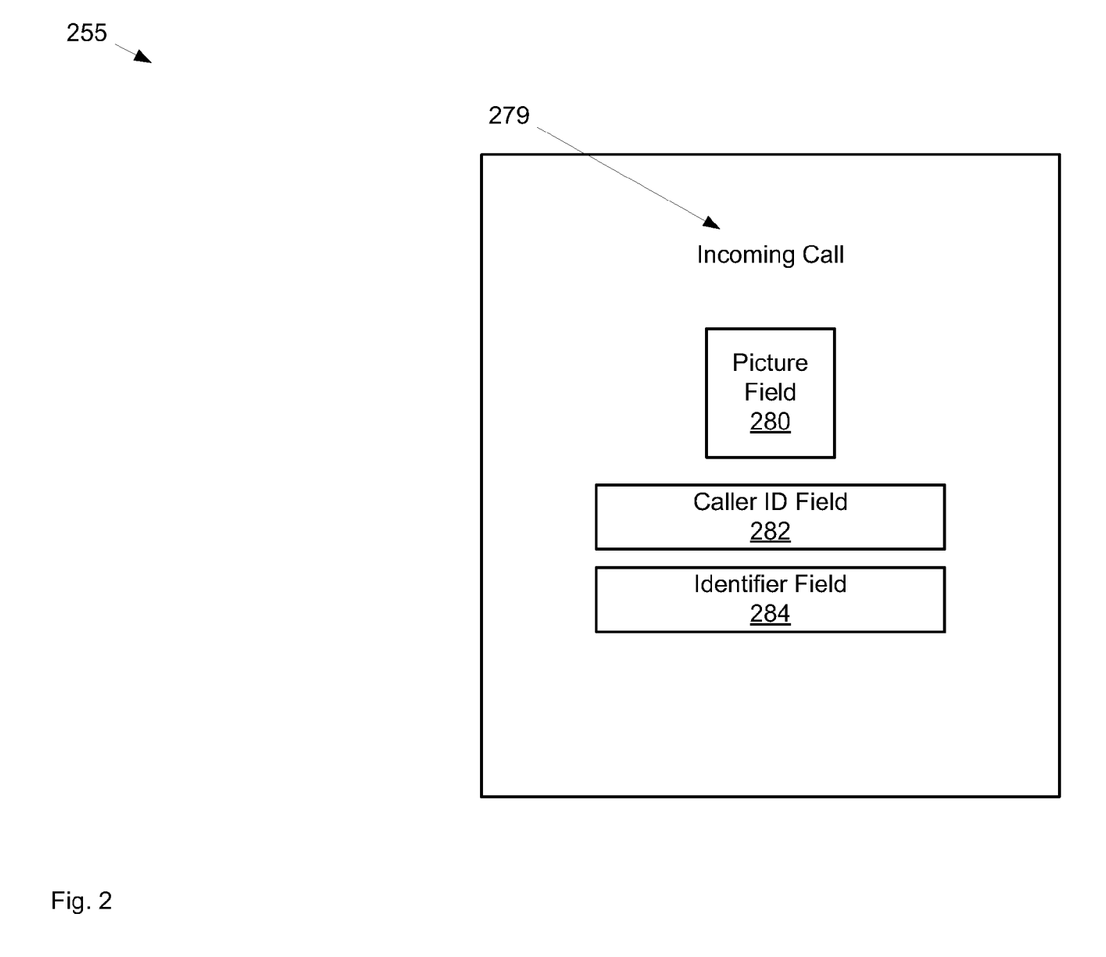
FIG. 2 depicts a template for providing an indication of an incoming communication in the system of FIG. 1, according to non-limiting implementations.

While template 255 has been described with reference to a telephone call, it is appreciated that non-volatile storage 212 can store any suitable number of similar templates for providing different types of incoming communications. For example, templates for incoming text messages, SMS (short message service) messages, MMS (multimedia message service) message, e-mail messages and the like can be provided.

In any event, it should be understood that in general a wide variety of configurations for device 101 are contemplated.

Devices 105 can be similar to or different from device 101 and each of devices, 105 can include, but is not limited to, any suitable combination of computing devices, personal computers, laptop computers, portable electronic devices, mobile computing device, portable computing devices, tablet computing devices, laptop computing devices, PDAs (personal digital assistants), cellphones, smartphones and the like. Other suitable communication devices are within the scope of present implementations. Further, while two devices 105 are depicted in FIG. 1, it is appreciated that system 100 can comprise any suitable number of communication devices. Devices 105 can comprise a processor, a communication interface, volatile and non-volatile storage, an input device, a display device, a microphone, and a speaker, similar to device 101.

Device 103 is appreciated to also comprise a processor, non-volatile storage, volatile storage, and a communication interface, however in depicted implementations device 103 comprises a server based on any well-known server environment including a module that houses one or more central processing units, volatile memory (e.g. random access memory), persistent memory (e.g. hard disk devices) and network interfaces to allow device 103 to communicate over links 106, 108. For example, device 103 can be a Sun Fire V480 running a UNIX operating system, from Sun Microsystems, Inc. of Palo Alto Calif., and having four central processing units each operating at about nine-hundred megahertz and having about sixteen gigabytes of random access memory. However, it is to be emphasized that this particular server is merely exemplary, and a vast array of other types of computing environments for device 103 are contemplated. It is further more appreciated that device 103 can comprise any suitable number of servers that can perform different functionality of server implementations described herein.

Figure 3:
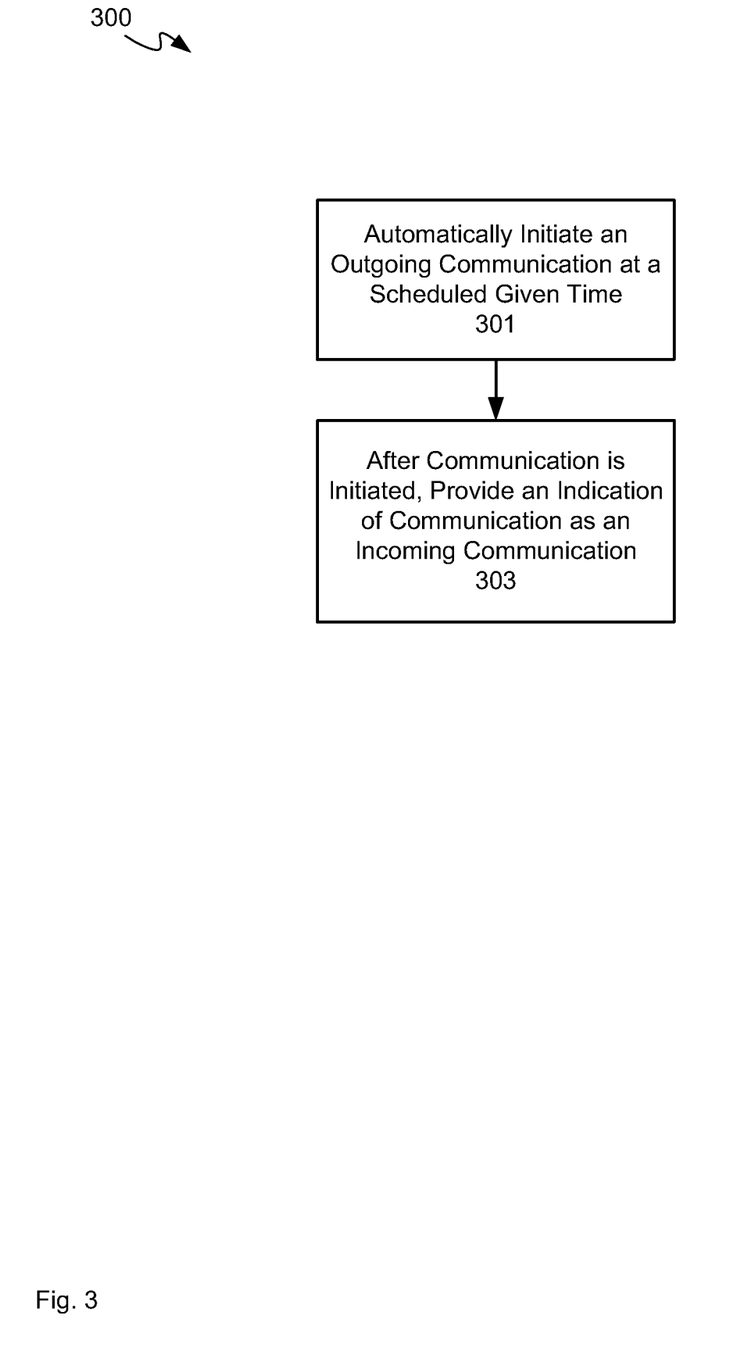
FIG. 3 depicts a method for providing an automatically initiated outgoing communication as an incoming communication, according to non-limiting implementations.

Attention is now directed to FIG. 3 which depicts a method 300 for providing an automatically initiated outgoing communication as an incoming communication, according to non-limiting implementations. In order to assist in the explanation of method 300, it will be assumed that method 300 is performed using system 100. Furthermore, the following discussion of method 300 will lead to a further understanding of system 100 and its various components. However, it is to be understood that system 100 and/or method 300 can be varied, and need not work exactly as discussed herein in conjunction with each other, and that such variations are within the scope of present implementations.

It is appreciated that, in some implementations, method 300 is implemented in system 100 by processor 208 of device 101 processing application 250. Indeed, method 300 is one way in which device 101 can be configured. It is to be empha-sized, however, that method 300 need not be performed in the exact sequence as shown; and likewise various blocks may be performed in parallel rather than in sequence; hence the elements of method 300 are referred to herein as "blocks" rather than "steps". It is also to be understood, however, that method 300 can be implemented on variations of system 100 as well.

Figure 4:
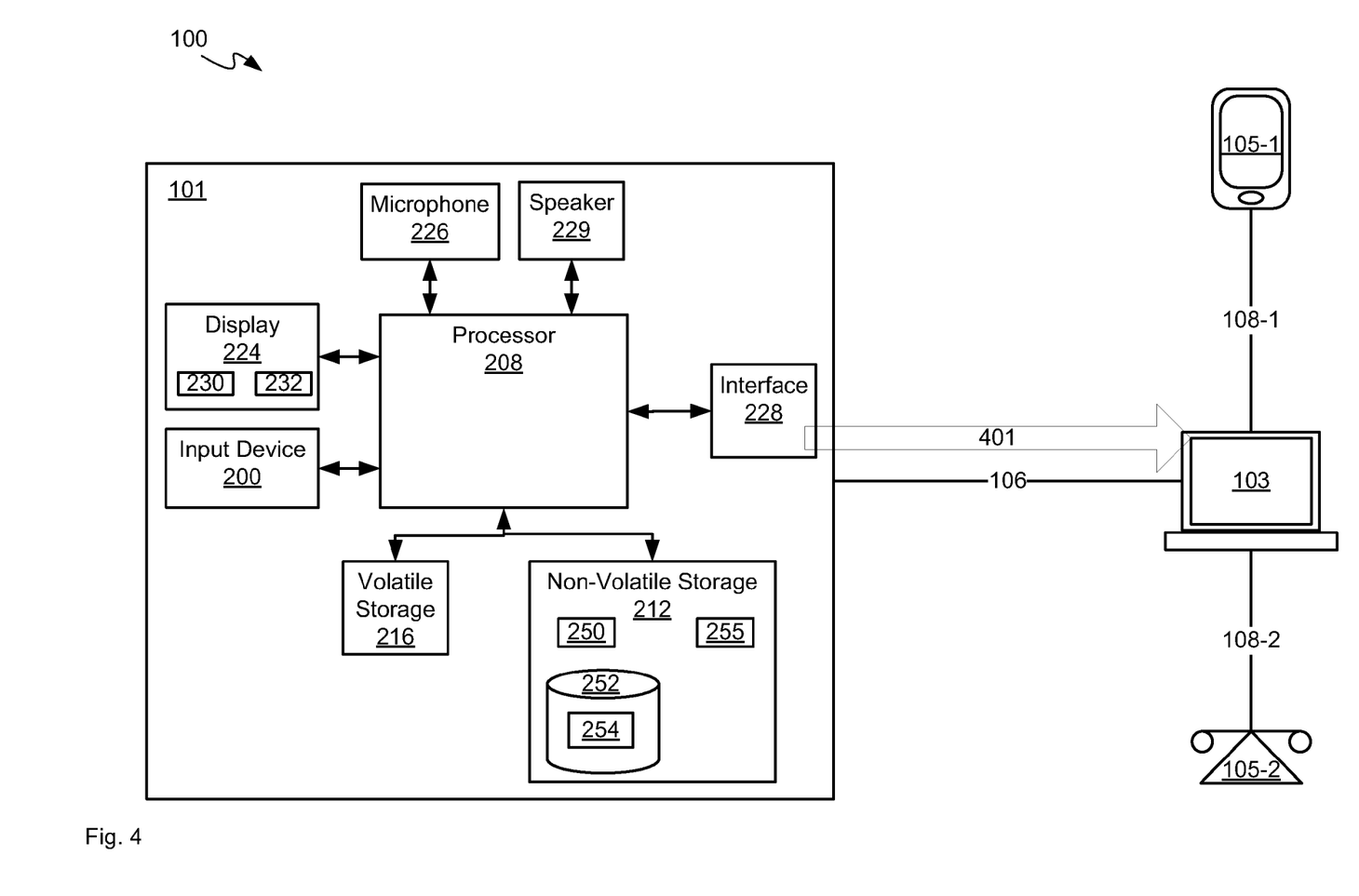
FIG. 4 depicts the system of FIG. 1 with an outgoing communication automatically initiated, according to non-limiting implementations.
Figure 5:
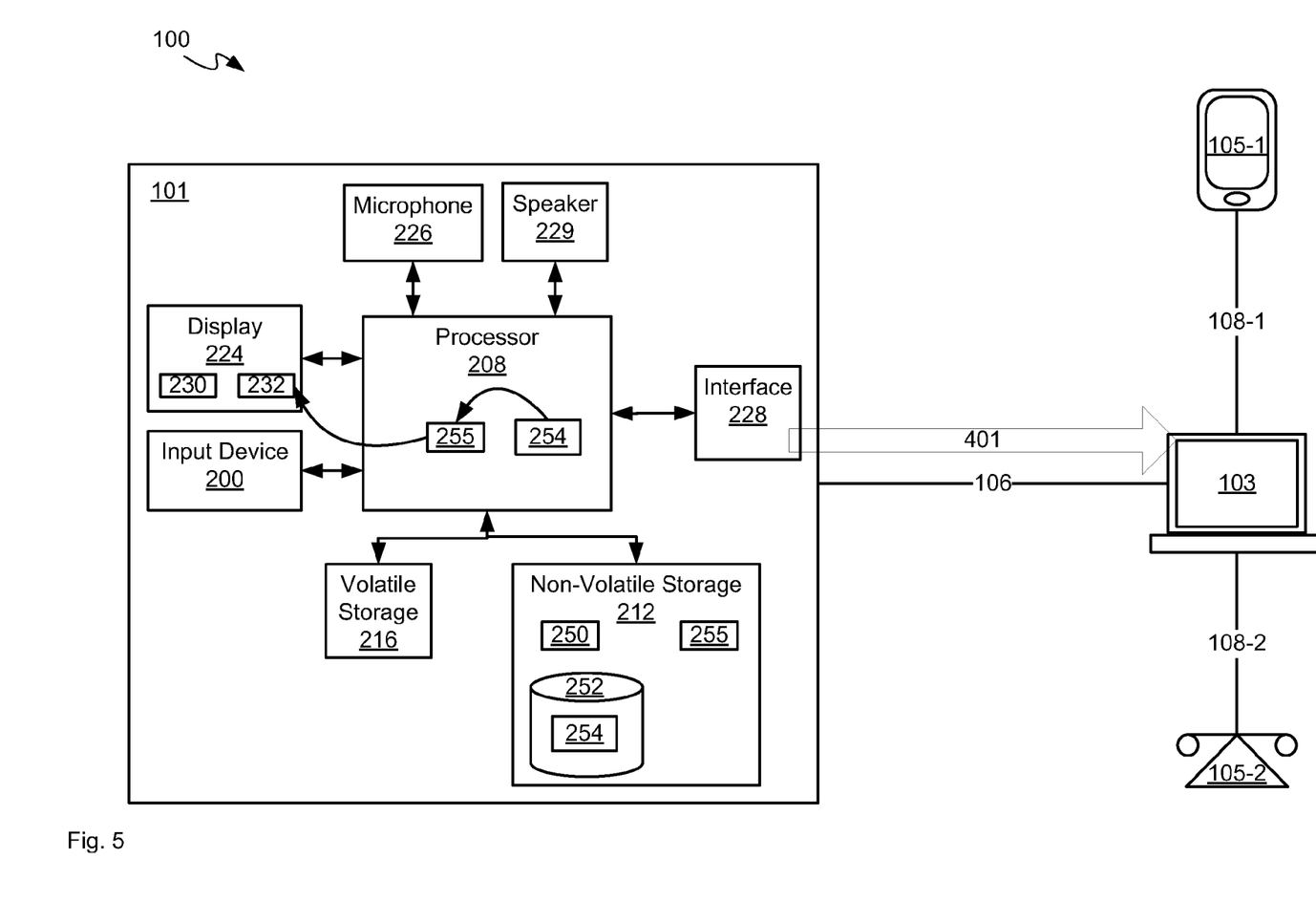
FIG. 5 depicts the system of FIG. 1 with the template of FIG. 2 populated using meeting data, according to non-limiting implementations.

Furthermore, method 300 will be described with reference to FIGS. 4 and 5, each of which are substantially similar to FIG. 1, with like elements having like numbers.

At block 301, an outgoing communication is automatically initiated at a scheduled given time. For example, processor 208 can determine that an outgoing communication is at the scheduled given time by processing calendar database 252 to determine that the outgoing communication is associated with meeting data 254 associated with the scheduled given time. With reference to Table 1 above, in a non-limiting example, processor 208 can determine that the outgoing communication with device 103 is scheduled at 10:00 am on Feb. 1, 2012; hence, in this example, the scheduled given time is 10:00 am on Feb. 1, 2012. With reference to FIG. 4, processor 208 initiates an outgoing communication 401 with device 103 via interface 228 by automatically "dialling" the dial-in number (e.g. with reference to Table 1, 204-555-1212) stored at meeting data 254. Dialling is appreciated to mean any suitable steps and/or transmission of data for setting up a communication with device 103, and is not meant to be limited to dialling of a telephone.

It is further appreciated, that block 301 can include: initiating outgoing communication 401; and, when a called communication device, such as device 103, responds to a request for initiating outgoing communication 401, automatically providing log-in data for joining a conference call to the called communication device. With reference to Table 1 above, in a non-limiting example, processor 208 can determine that meeting data 254 comprises log-in data (e.g. with reference to Table 1, Log-In Code 3459345); hence, once outgoing communication 401 is initiated, the log-in data, when present, can be provided to device 103 (e.g. by using DTMF (dial-tone multi-frequency) signalling and the like, for example to join a conference call).

Furthermore, outgoing communication 401 can be automatically initiated at one or more of the scheduled given time and within a given time period before the scheduled given time. For example, with further reference to Table 1, outgoing communication 401 can be automatically initiated at 10:00 am on Feb. 1, 2012 and/or within a given time period before 10:00 am on Feb. 1, 2012, such as 5 minutes before the scheduled given time. However, the scheduling of outgoing communication 401 is generally considered to be non-limiting and outgoing communication 401 can be scheduled at any suitable time.

Further, in some implementations, the scheduled time can be configurable, while in other implementations the scheduled time can be automatically determined. For example, application 250 can be configured to initiate communications at a scheduled given time stored at associated meeting data stored in calendar database 252. Alternatively, application 250 can be configured to initiate communications a given time period before a scheduled given time stored at associated meeting data stored in calendar database 252. In yet further alternatives, respective scheduled given times can be configured for each set of meeting data stored at calendar database 252 associated with a telephone number and/or remote device identifier.

In yet further implementations, the scheduled time can be automatically determined, for example via processor 208 processing associated meeting data to determine whether log-in data, and the like, are to be provided when initiating an outgoing communication and determining the scheduled time based on such. For example, threshold values can be set to determine the scheduled given time: in some non-limiting implementations, when the number of characters in the log-in data is below a threshold number of characters the scheduled time can be the scheduled given time, and when the number of characters in the log-in data is at or above a threshold number of characters, the scheduled time can be at a time that is a given time period before the scheduled given time.

Alternatively, when the number of login codes in the log-in data is below a threshold number of log-in codes, the scheduled time can be the scheduled given time, and when the number of log-in codes in the log-in data is at or above a threshold number of log-in codes, the scheduled time can be at a time that is a given time period before the scheduled given time. In other words, processor 208 is enabled to estimate the amount of time needed to dial the log-in number and subsequently log-in to the conference call.

Further, processor 208 can be enabled to provide log-in data after a given time period following dialling the log-in number, and/or when prompted by the called communication device.

Further, in some implementations, block 301 executes without providing any indication at device 101 that outgoing communication 401 is being initiated: for example, no dial-out indication is rendered at display 224, no dial-out tones are provided at speaker 229, and when device 101 comprises optional notification devices, such notification devices are not activated. In other words, processor 208 suppresses notifications associated with out-going communications, and/or thus to initiate such notifications. Put another way, outgoing communication 401 is initiated in the background.

In yet further implementations, outgoing communication 401 can be initiated without providing an indicator of outgoing communication 401 other than an indication rendered in an indicator area of display 224, including but not limited to an icon, a status icon, a radio-in-use icon and the like. The indicator area can comprise a header of representation 232 at display 224.

In yet further implementations, at least a portion of normally provided indications outgoing communications are suppressed when outgoing communication 401 is initiated. For example, one or more of a dial-out indication and a dial-tone is suppressed. In some of these implementations, at least a portion of normally provided indications of outgoing communications are suppressed by muting speaker 229. Further, at least a portion of normally provided indications of outgoing communications can be suppressed by preventing rendering of an identifier of a remote communication device associated with outgoing communication 401: for example, when outgoing communication 401 is intended for device 103, an identifier of device 103, for example a telephone number, is not rendered at display 224.

Rather, returning to FIG. 3, at block 303 after outgoing communication 401 is initiated, an indication of outgoing communication 401 is provided at device 101, such that outgoing communication 401 is provided as an incoming communication at device 101. In some implementations, a notification device at device 101 is activated to indicate that an incoming call can be accepted or declined: for example device 101 rings, vibrates, a light flashes, and/or a notification is rendered at display 224.

Figure 6:
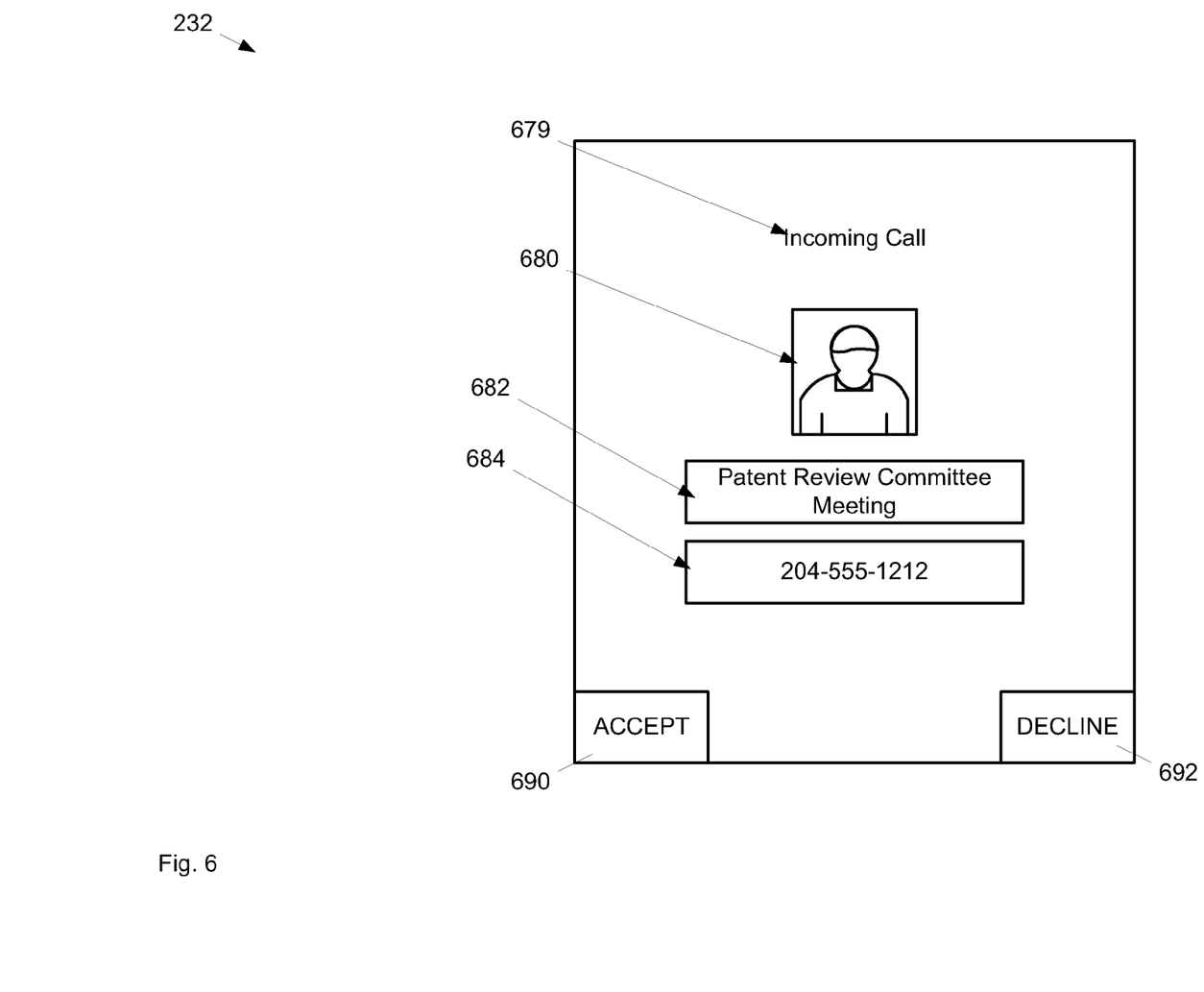
FIG. 6 depicts an indication of an outgoing communication provided as an incoming communication, according to non-limiting implementations.

Alternatively, template 255 can be populated and rendered at display 224. For example, attention is again directed to FIG. 5 which depicts processor 208 processing meeting data 254 to populate fields 282, 284 of template 255, and a representation of such is rendered in representation 232 at display 224. A non-limiting example of representation 232 is depicted in FIG. 6. From FIG. 6 it is appreciated that each of elements 679, 680, 682, 684 of representation 232 corresponds to fields 279, 280, 282, 284 of template 255. For example, element 679 comprises text "Incoming Call" similar to field 279. Element 680 corresponds to field 280, however populated with generic image data as no incoming communication was actually received; rather an outgoing communication was initiated; in implementations where image data is stored at non-volatile storage 212 in association with, for example, an identifier of device 103, processor 208 can populate field 280 with such image data.

Element 682 corresponds to field 282, however populated with "Subject" data from Table 1. Similarly, element 684 corresponds to field 284, however populated with the "Dial-In Number" data from Table 1. Hence, "Subject" data of Table 1 is rendered as a caller ID in representation 232 and "Dial-In Number" of Table 1 is rendered as an identifier of device 103. In other words, an indication (e.g. representation 232) of outgoing communication 401 is provided as if outgoing communication 401 were actually an incoming communication.

To this end, representation 232 further comprises virtual buttons 690, 692 for respectfully accepting outgoing communication 401 or declining outgoing communication 40, as if outgoing communication 401 were an incoming call; each buttons 690, 692 can be actuated via input device 200. In other words, device 101 provides representation 232 as an indication of outgoing communication 401, but as if outgoing communication 401 were actually an incoming communication and further uses the same template 255 used to provide indications of incoming communications. Buttons 690, 692 are appreciated to be only one implementation for accepting or declining outgoing communication 401, and that any suitable process and/or hardware for accepting or declining outgoing communication 401 is within the scope of present implementations.

It is appreciated that the indication of outgoing communication 401 is provided as one or more of a caller ID, an identifier of outgoing communication 401, an identifier of a conference call associated with outgoing communication 401, and an identifier of meeting data associated with the outgoing communication. Examples of various identifiers include, but are not limited to, a subject stored in associated meeting data 254, start and end times associated with meeting data 254, an identifier of device 103, such as a telephone number, log-in data associated with meeting data 254, some or all of which can be provided in fields 282, 284 of template 255, and the like.

In implementations where speaker 229 is muted at block 301, at block 303 speaker is unmuted.

Various alternatives and variations of method 300 are within the scope of present implementations.

For example, method 300 can further comprise, when connecting outgoing communication 401 is unsuccessful, automatically reattempting automatically initiating the outgoing communication 401 after a given time period. For example, when outgoing communication 401 is not successful at connecting with device 103, for example because device 103 is busy and the like, block 301 can be re-executed after a suitable given time period (e.g. a few minutes). Block 301 can repeat until communication 401 is successful. In other words, device 101 reattempts to connect with device 101 if previous attempts to connect with device 103 are unsuccessful. In some of these implementations, method 300 can end after a given number of executions of block 301 and/or after a given time period.

In yet further implementations, no response to an indication of outgoing communication 401 can occur. In other words, when representation 292 of FIG. 6 is provided at device 101, neither of buttons 690, 692 are actuated. Such a situation can be referred to as a "missed call". In these implementations, a missed call log (not depicted) stored at non-volatile storage 212 can be provided which stores a missed call entry associated with communication 401. For example, a missed call entry could include, but is not limited to, data provided at one or more of elements 682, 684, along with additional context data indicating a context of associated communication 401. For example, the call log entry could comprise one or more icons indicating that the missed communication 401 was an outgoing call, a conference call or the like. As a further example, when communication 401 is associated with a reminder, such as a birthday reminder, the icon could comprise a picture associated with the reminder: when a birthday reminder, the icon could comprise a birthday cake, etc.

In any event, storing of context information associated with communication 401 in the missed call entry could enable missed call log to processed and/or accessed in the context of communication 401. At a minimum, such context information could indicate to a user of device 101 the nature of communication 401 when the missed call entry is rendered at display 224 along with the context information.

In some of these implementations, the missed call entry can comprise additional options based on context when rendered at display 224. For example, when communication 401 was missed and communication 401 comprised a conference call, when the associated missed call entry is rendered at display 224, options related to conference calls can be provided as virtual buttons, including but not limited to "Join Conference", "Join Conference Silently", "Join Conference as Moderator", and the like; when a virtual buttons are actuated, the indicated action be taken at device 101.

Indeed, in yet further implementations, the indication (e.g. representation 232) of outgoing communication 401 can be provided when one of a called communication device (e.g. device 103) answers outgoing communication 401 (e.g. the call to device 103 is answered), and when outgoing communication 401 is togged into an associated conference call. For example, processor 208 can be enabled to render the indication (e.g. representations 232) of outgoing communication when device 103 answers outgoing communication 403, such that when accept button 690 is actuated, device 103 is connected and, other then entering the log-in data (which can be done either manually or automatically), device 103 is connected to device 101, and a user of device 101 can start speaking in the conference call. Similarly, the indication (e.g. representation 232) of outgoing communication 401 can be provided when outgoing communication 401 is logged into an associated conference call such that upon actuation of button 690, a user of device 101 can start speaking in the conference call.

However, providing the indication of outgoing communication 401 can be provided before a called communication device (e.g. device 103) answers outgoing communication 401. In these implementations, when button 690 is actuated, "ringing" or any other suitable notification is played at speaker 229 to indicate that the called communication device (e.g. device 103) has not yet accepted outgoing communication 401. Alternatively, when the indication is provided before one of a called communication device (e.g. device 103) answers the outgoing communication 401 and the outgoing communication 401 is logged into an associated conference call, the outgoing communication 401 can be muted until, for example the outgoing communication 401 is answered and/or the conference call is entered.

While present implementations have been described with reference to dialling into a conference call at a conference call server, it is appreciated that method 300 is not so limited. Rather, method 300 can be implemented at device 101 to provide an automatically initiated outgoing communication to any suitable communication device as an incoming communication, for example one or more of devices 105. Further, method 300 can be implemented sequentially to set up conference calls. For example, when meeting data 254 comprises more than one phone number, each number can be dialled in any suitable sequence, in the background (i.e. block 301 executes more than once, and/or one time for each phone number), and block 303 executes at a suitable time, for example once each phone number is connected.

Furthermore, method 300 is not limited to phone calls. Rather, any outgoing communication can be provided at device 101 as an incoming communication. For example, device 101 can automatically initiate a text message session and provide an outgoing text message as an incoming text message. As a further example, device 101 can automatically initiate a video call and provide an outgoing video call as an incoming video call.

In any event, providing an automatically initiated outgoing communication as an incoming communication, a convenient method of automatically setting up communications between devices is provided, as well as a convenient method of ensuring that scheduled meetings conducted via communication devices is attended.

Those skilled in the art will appreciate that in some implementations, the functionality of device 101 can be implemented using pre-programmed hardware or firmware elements (e.g., application specific integrated circuits (ASICs), electrically erasable programmable read-only memories (EEPROMs), etc.), or other related components. In other implementations, the functionality of devices 101 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A communication device comprising:
a processor and a communication interface, the processor enabled to:
automatically initiate an outgoing communication at a scheduled given time via the communication interface; and,
when the outgoing communication is initiated, provide an indication of an incoming communication being received rather than of the outgoing communication being initiated wherein the indication is provided as a caller ID (identification), wherein the indication of the incoming communication is further provided as one or more of: an incoming communication template with fields populated with outgoing communication data, an identifier of the outgoing communication, an identifier of a conference call associated with the outgoing communication, and an identifier of meeting data associated with the outgoing communication.

2. The communication device of claim 1, wherein the processor is further enabled to determine that the outgoing communication is scheduled by processing a calendar database to determine that the outgoing communication is associated with meeting data associated with the scheduled given time.

3. The communication device of claim 1, wherein the processor is further enabled to automatically initiate the outgoing communication at one or more of the scheduled given time and within a given time period before the scheduled given time.

4. The communication device of claim 1, wherein the processor is further enabled to automatically initiate the outgoing communication by:
initiating the outgoing communication; and, when a called communication device responds to a request for initiating the outgoing communication, automatically providing log-in data for joining a conference call to the called communication device.

5. The communication device of claim 1, wherein the processor is further enabled to, when connecting the outgoing communication is unsuccessful, automatically reattempt to automatically initiate the outgoing communication after a given time period.

6. The communication device of claim 1, wherein the processor is further enabled to provide the indication of the outgoing communication when one of a called communication device answers the outgoing communication, and when the outgoing communication is logged into an associated conference call.

7. The communication device of claim 1, wherein the processor is further enabled to, when the indication is provided before one of a called communication device answers the outgoing communication and the outgoing communication is logged into an associated conference call, mute the outgoing communication.

8. A method comprising:
automatically initiating, at a processor of a communication device, an outgoing communication at a scheduled given time via a communication interface of the communication device; and,
when the outgoing communication is initiated, providing an indication of an incoming communication being received rather than of the outgoing communication being initiated at the communication device wherein the indication is provided as a caller ID (identification), wherein the indication of the incoming communication is further provided as one or more of: an incoming communication template with fields populated with outgoing communication data, an identifier of the outgoing communication, an identifier of a conference call associated with the outgoing communication, and an identifier of meeting data associated with the outgoing communication.

9. The method of claim 8, further comprising determining that the outgoing communication is scheduled by processing a calendar database to determine that the outgoing communication is associated with meeting data associated with the scheduled given time.

10. The method of claim 8, wherein the outgoing communication is automatically initiated at one or more of the scheduled given time and within a given time period before the scheduled given time.

11. The method of claim 8, wherein the automatically initiating the outgoing communication comprises:
initiating the outgoing communication; and, when a called communication device responds to a request for initiating the outgoing communication, automatically providing log-in data for joining a conference call to the called communication device.

12. The method of claim 8, further comprising, when connecting the outgoing communication is unsuccessful, automatically reattempting automatically initiating the outgoing communication after a given time period.

13. The method of claim 8, wherein the indication of the outgoing communication is provided when one of a called communication device answers the outgoing communication, and when the outgoing communication is logged into an associated conference call.

14. The method of claim 8, wherein when the indication is provided before one of a called communication device answers the outgoing communication and the outgoing communication is logged into an associated conference call, the outgoing communication is muted.

15. A non-transitory computer medium comprising computer code adapted to execute a method comprising:
automatically initiate an outgoing communication at a scheduled given time via the communication interface; and,
when the outgoing communication is initiated, provide an indication of an incoming communication being received rather than of the outgoing communication being initiated wherein the indication is provided as a caller ID (identification), wherein the indication of the incoming communication is further provided as one or more of: an incoming communication template with fields populated with outgoing communication data, an identifier of the outgoing communication, an identifier of a conference call associated with the outgoing communication, and an identifier of meeting data associated with the outgoing communication.

* * * * *